(12) United States Patent
Takeda et al.

(10) Patent No.: US 12,040,467 B2
(45) Date of Patent: Jul. 16, 2024

(54) POWER SUPPLY DEVICE

(71) Applicant: SANYO Electric Co., Ltd., Osaka (JP)

(72) Inventors: Nao Takeda, Hyogo (JP); Naotake Yoshida, Hyogo (JP); Kazuhiro Harazuka, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 681 days.

(21) Appl. No.: 17/266,682

(22) PCT Filed: Jul. 26, 2019

(86) PCT No.: PCT/JP2019/029340
§ 371 (c)(1),
(2) Date: Feb. 8, 2021

(87) PCT Pub. No.: WO2020/054229
PCT Pub. Date: Mar. 19, 2020

(65) Prior Publication Data
US 2021/0305640 A1 Sep. 30, 2021

(30) Foreign Application Priority Data

Sep. 11, 2018 (JP) .................... 2018-169256

(51) Int. Cl.
*H01M 10/613* (2014.01)
*H01M 10/647* (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
CPC ........... H01M 10/6555; H01M 10/613; H01M 10/647; H01M 10/658; H01M 50/227
See application file for complete search history.

(56) References Cited

U.S. PATENT DOCUMENTS

| 2013/0260197 A1 | 10/2013 | Okada et al. |
| 2017/0301965 A1 | 10/2017 | Kato et al. |

(Continued)

FOREIGN PATENT DOCUMENTS

| CN | 207199806 U | 4/2018 |
| JP | 2011-034775 | 2/2011 |

(Continued)

OTHER PUBLICATIONS

Extended (Supplementary) European Search Report dated Nov. 4, 2021, issued in counterpart EP application No. 19860020.7. (7 pages).

(Continued)

*Primary Examiner* — Olatunji A Godo
(74) *Attorney, Agent, or Firm* — WHDA, LLP

(57) ABSTRACT

The power supply device includes a plurality of battery cells each having a square outer shape, a plurality of separators for insulating the adjacent battery cells, and a restraining member that assembles the plurality of battery cells and the plurality of separators. Each of separators has heat insulating properties. Further, each of separators is disposed between the plurality of battery cells. Further, each of separators includes contact portion that comes into contact with adjacent battery cell, and thin portion formed thinner than contact portion.

7 Claims, 6 Drawing Sheets

(51) Int. Cl.
  *H01M 10/6555* (2014.01)
  *H01M 10/658* (2014.01)
  *H01M 50/204* (2021.01)
  *H01M 50/209* (2021.01)
  *H01M 50/227* (2021.01)
  *H01M 50/293* (2021.01)

(52) U.S. Cl.
  CPC ....... *H01M 10/658* (2015.04); *H01M 50/204* (2021.01); *H01M 50/209* (2021.01); *H01M 50/227* (2021.01); *H01M 50/293* (2021.01)

(56) References Cited

U.S. PATENT DOCUMENTS

| | | |
|---|---|---|
| 2019/0181399 A1 | 6/2019 | Kaga et al. |
| 2019/0190098 A1 | 6/2019 | Abe |
| 2020/0058912 A1 | 2/2020 | Kuramitsu et al. |

FOREIGN PATENT DOCUMENTS

| | | |
|---|---|---|
| JP | 2016-084836 | 5/2016 |
| WO | 2018/003478 | 1/2018 |
| WO | 2018/061894 | 4/2018 |
| WO | 2018/110055 A1 | 6/2018 |

OTHER PUBLICATIONS

International Search Report of PCT application No. PCT/JP2019/029340 dated Oct. 8, 2019.

POWER SUPPLY DEVICE

CROSS-REFERENCE TO RELATED APPLICATIONS

This application is a U.S. national stage application of the PCT International Application No. PCT/JP2019/029340 filed on Jul. 26, 2019, which claims the benefit of foreign priority of Japanese patent application No. 2018-169256 filed on Sep. 11, 2018, the contents all of which are incorporated herein by reference.

TECHNICAL FIELD

The present invention relates to a power supply device including a plurality of battery cells.

BACKGROUND ART

In recent years, electric vehicles that each use a power supply device for propulsion have become widespread. Various configurations of electric vehicles are known. For example, an electric vehicle (BEV: Battery Electric Vehicle) equipped with a driving motor, a hybrid car (HEV: Hybrid Electric Vehicle) equipped with an engine in addition to a motor and so on can be cited. In the power supply device mounted on each of these electric vehicles, a plurality of battery cells are used. Each of the battery cells is a rechargeable secondary battery such as a lithium ion battery or a nickel hydrogen battery. In this type of power supply device, it is desirable that a space occupied by the power supply device is small, and it is required to improve space efficiency. As a power supply device having excellent space efficiency, a power supply device including a plurality of square batteries stacked in one direction and a restraining member for assembling the plurality of square batteries is known (PTL 1). The power supply device of PTL 1 includes a plurality of battery cells and insulating separators disposed between adjacent battery cells among the plurality of battery cells.

CITATION LIST

Patent Literature

PTL 1: Unexamined Japanese Patent Publication No. 2011.034775

SUMMARY OF THE INVENTION

It is known that a secondary battery causes various problems when temperature becomes high. In particular, if a chemical reaction of an internal power generation element is promoted by heat, there is a risk that the heat generated by the chemical reaction further causes self-heating. On the other hand, the power supply device of PTL 1 has a configuration in which the battery cells are disposed close to each other, and thus, when one of the battery cells enters a self-heated state due to some abnormality, the heat is transferred to the battery cell adjacent to the one battery cell. When an amount of the heat transferred from the battery cell in the abnormal state to the adjacent battery cell is large, there is a risk that the transferred heat promotes a chemical reaction of the power generation element inside the adjacent battery cell. In order to suppress such heat propagation, it is necessary to thicken the separator provided for insulation, but such a configuration causes an increase in the size of the power supply device and causes a problem that space efficiency is lowered.

The present invention has been made to solve such a problem, and a main object of the present invention is to provide a power supply device including a configuration for suppressing heat transfer between adjacent battery cells while suppressing an increase in size of the power supply device.

A power supply device according to an aspect of the present invention includes a plurality of battery cells each having a square outer shape, a plurality of separators for insulating adjacent battery cells among the plurality of battery cells, and a restraining member that assembles the plurality of battery cells and the plurality of separators. Each of the separators has heat insulating properties. Further, each of the separators is disposed between the adjacent battery cells. Further, each of the separators includes a contact portion that comes into contact with the adjacent battery cell, and a thin portion formed thinner than the contact portion and separated from a surface of the adjacent battery cell.

According to the power supply device according to the present invention, heat can be insulated by the separator interposed between the adjacent battery cells, so that an effect that heat transfer between the adjacent battery cells can be suppressed while suppressing an increase in size of the power supply device is exerted.

DESCRIPTION OF EMBODIMENTS

First, a background to an idea of a configuration of a heat insulating member of a certain aspect of the present invention will be described. As shown in PTL 1, in a typical power supply device, a plurality of battery cells are disposed in the same orientation. Insulating separators are each disposed between adjacent battery cells in order to prevent a short circuit between the adjacent battery cells. On the other hand, in recent years, as a capacity of a battery cell has increased, an amount of energy possessed by each battery cell has tended to increase.

As described above, since the power supply device of PTL 1 has a configuration in which the battery cells are disposed close to one another, when one of the battery cells enters in a self-heated state due to some abnormality, the heat is transferred to the battery cell adjacent to the one battery cell. When the amount of heat transferred from the battery cell in the abnormal state to the adjacent battery cell is large, there is a risk that the transferred heat promotes a chemical reaction of a power generation element inside the adjacent battery cell. When the capacity of the battery cell is increased, the amount of heat transferred from the battery cell in an abnormal state to the adjacent battery cell becomes relatively larger, so that there is a possibility that this phenomenon becomes a problem.

In response to this problem, the inventors of the present invention have studied a configuration that employs a separator having heat insulating properties. In the conventional power supply device, a resin having high moldability is used for the separator. Therefore, in order to improve the heat insulating properties, it is necessary to increase a material thickness of the separator. However, if a thickness of the separator is increased, a size of the power supply device is increased, and there is a problem that a capacity per volume of the power supply device is reduced. In view of the above-described actual situation, the present inventors have studied a configuration for reducing an increase in the thickness of the separator while maintaining moldability.

First Exemplary Embodiment

Figure 1:
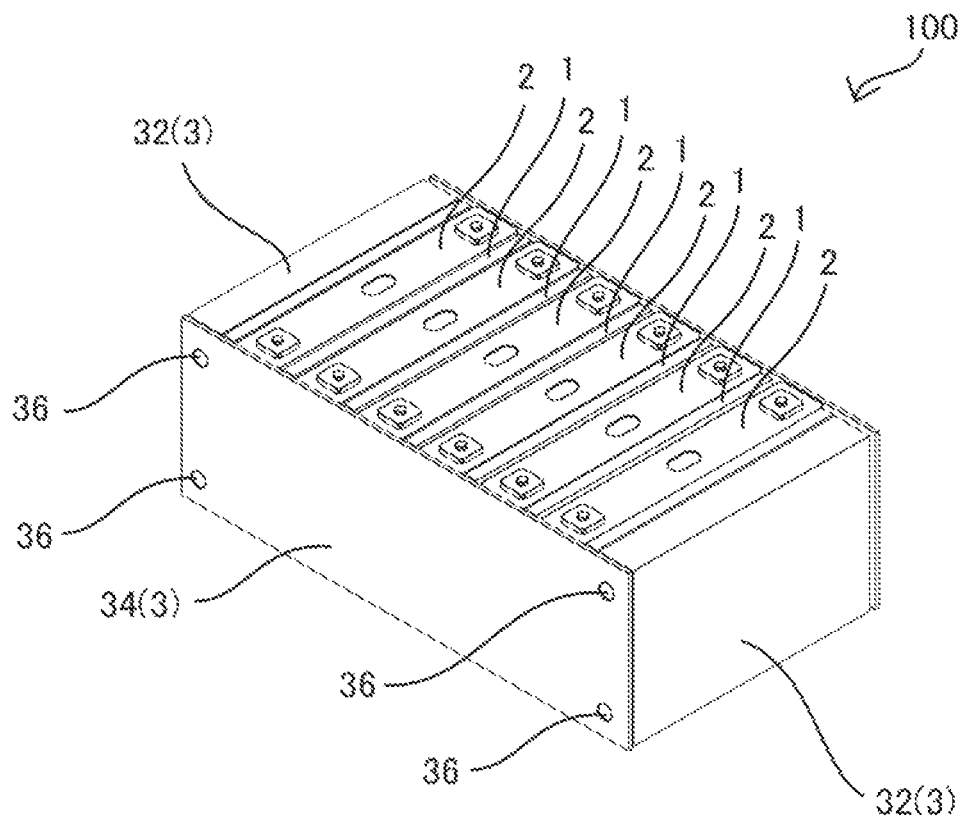
FIG. 1 is a perspective view of a power supply device according to a first exemplary embodiment of the present invention.

FIG. 1 is a perspective view showing power supply device 100 of a first exemplary embodiment of the present invention. As shown in FIG. 1, power supply device 100 includes a plurality of battery cells 1, a plurality of separators 2, and restraining member 3 that assembles the plurality of battery cells 1 and the plurality of separators 2. The plurality of battery cells 1 are disposed along one direction. Each of separators 2 is disposed between adjacent battery cells 1 among the plurality of battery cells 1. The plurality of separators 2 each have insulating properties and prevent a short circuit between adjacent battery cells 1. Further, separator 2 has heat insulating properties and suppresses heat transfer between the adjacent battery cells. The plurality of battery cells 1 are connected in series or in parallel via a bus bar (not shown). In power supply device 100, a voltage and a capacity of the power supply device are determined in accordance with a number of battery cells 1 connected in parallel and a number of battery cells 1 connected in series. As each of battery cells 1, various secondary batteries such as a lithium ion secondary battery and a nickel hydrogen battery can be adopted.

As shown in FIG. 1, restraining member 3 includes a pair of end plates 32 disposed at both ends of the plurality of battery cells 1 stacked in a stacking direction, and a plurality of bind bars 34 fixed to the pair of end plates 32. End portions of bind bars 34 are connected to end plates 32. Each of bind bars 34 is fixed to each of end plates 32 via set screws 36.

Bind bars 34 are each manufactured by processing a metal plate having a predetermined thickness to have a predetermined width. Bind bars 34 connect their end portions to end plates 32 to connect the pair of end plates 32, and hold battery cells 1 between end plates 32. Bind bars 34 fix the pair of end plates 32 with a predetermined size, thereby suppressing expansion of battery cells 1 stacked between end plates 32. When bind bars 34 are stretched, the expansion of battery cells 1 cannot be inhibited. Therefore, bind bars 34 are each manufactured by processing a metal plate to have a width and a thickness, the metal plate having enough strength to prevent the metal plate from stretching due to an expansion pressure of battery cell 1, for example, a stainless steel plate such as SUS304, or a metal plate such as a steel plate.

Note that while bind bars 34 in FIG. 1 are fixed to end plates 32 with set screws 36, they do not necessarily have to be fixed with screw members. Specifically, bind bars 34 can be fixed by using welding, a locking structure, or the like. Further, while power supply device 100 of FIG. 1 has the configuration in which bind bars 34 are fixed to the side surfaces of end plates 32, a fixing structure of the end plates and the bind bars is not limited to the configuration shown in the drawing. A function required as bind bars 34 is to regulate a relative distance between the pair of end plates 32. End plates 32 and bind bars 34 may have any configuration as long as displacement of the pair of end plates can be regulated.

(Battery Cell)

Figure 2:
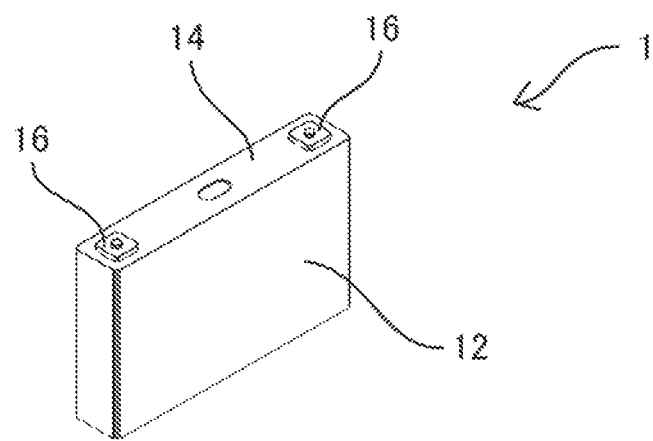
FIG. 2 is a perspective view of a battery cell of FIG. 1.

As shown in FIG. 2, battery cell 1 includes rectangular parallelepiped outer can 12 and sealing body 14 provided with positive and negative electrode terminals 16. Further, battery cell 1 has an electrode body housed in outer can 12, and outer can 12 is filled with an electrolytic solution, so that battery cell 1 has a characteristic of expanding or contracting due to charge and discharge, or deterioration.

Outer can 12 is formed into a box shape having an opening. Sealing body 14 is welded to outer can 12 with the opening of outer can 12 closed. Specifically, outer can 12 is manufactured by subjecting a metal plate of aluminum or an aluminum alloy to deep drawing. Similar to outer can 12, sealing body 14 is manufactured, using a metal plate of aluminum or an aluminum alloy. Positive and negative electrode terminals 16 are fixed to both end portions of sealing body 14. Sealing body 14 is welded in a state inserted into the opening portion of outer can 12. Typically, sealing body 14 is airtightly fixed to outer can 12 by irradiating a boundary between an outer circumference of sealing body 14 and an inner circumference of outer can 12 with a laser beam. In battery cell 1 having the above configuration, a welded portion where the opening portion of the outer can and the sealing body are welded is formed along an upper end of the outer can. When battery cell 1 expands, there is a risk that the welded portion is damaged, and thus, it is important to suppress deformation of an upper end portion of the outer can.

(Separator 2)

Figure 3:
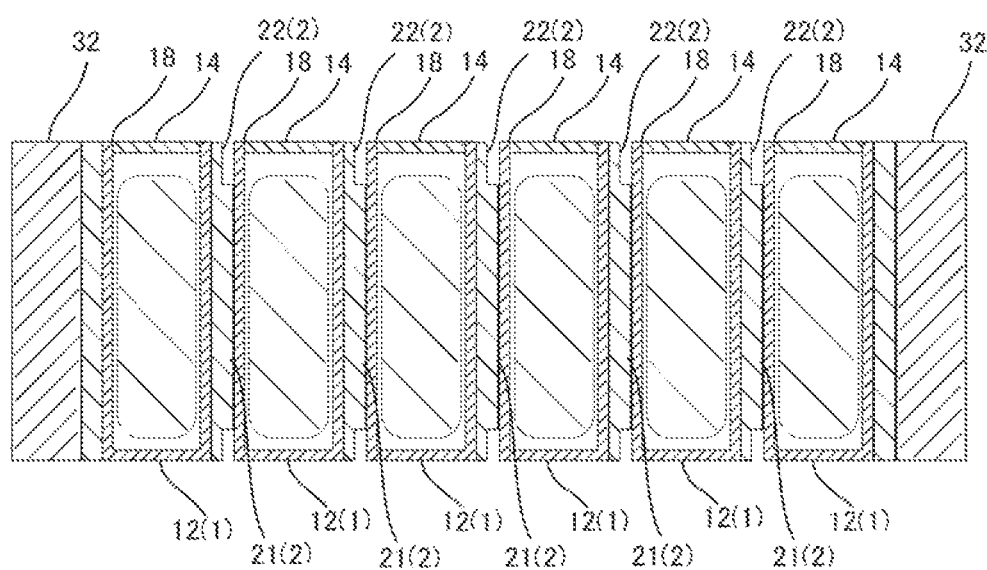
FIG. 3 is a cross sectional view of the power supply device of FIG. 1.

As shown in FIG. 3, each of separators 2 includes contact portion 21 that comes into contact with an adjacent battery cell, and thin portion 22 that is formed thinner than contact portion 21. Contact portion 21 is provided at a position corresponding to a central portion of outer can 12 of battery cell 1, and presses a wide surface of outer can 12 to suppress the expansion of battery cell 1. Thin portion 22 is provided adjacent to contact portion 21, and extends along the upper end of outer can 12 of adjacent battery cell 1. In particular, thin portion 22 is configured to be opposed to welded portion 18 where the opening portion of outer can 12 and sealing body 14 are welded, welded portion 18 being formed along the upper end of outer can 12. When welded portion 18 is pressed, a stress is concentrated on welded portion 18 and there is a risk that welded portion 18 is damaged. However, separator 2 has the configuration in which contact portion 21 protrudes from thin portion 22 toward battery cell 1, by which it is possible to prevent thin portion 22 from pressing welded portion 18.

Note that while separator 2 shown in FIG. 3 has a step formed at a boundary between contact portion 21 and thin portion 22, a shape does not necessarily have to be such that a step is formed. Separator 2 shown in FIG. 3 is one example for clarifying the configuration, and for example, a shape in which a taper is provided at the boundary between the contact portion and the thin portion and the shape gradually changes can be adopted.

Note that battery cell 1 having the outer can and the sealing body made of a metal exposes the metal on a surface. Typically, a configuration is known in which in order to prevent a short circuit through condensed water or the like, the surface of outer can 12 is covered with a heat shrinkable tube. In the present exemplary embodiment, if necessary, the configuration in which the surface of outer can 12 is covered with a heat shrinkable tube may also be adopted. When battery cell 1 having the configuration in which the surface of outer can 12 is covered with the heat shrinkable tube is used, contact portion 21 presses outer can 12 via the heat shrinkable tube. Therefore, in the present invention, the contact between contact portion 21 and the outer can is not intended to be limited to direct contact, and a state is included where contact portion 21 indirectly presses outer can 12.

On the other hand, as described above, when the amount of heat transferred from the battery cell in an abnormal state to the adjacent battery cell is large, there is a risk that the transferred heat promotes a chemical reaction of the power generation element inside the adjacent battery cell, and thus, separator 2 is configured to include a heat insulating member having heat insulating properties.

(Heat Insulating Member)

The heat insulating member included in separator 2 is a sheet having a thickness of 0.1 mm to 1.5 mm, and includes a fiber sheet made of a woven fabric, a non-woven fabric, or the like, and a porous material supported between fibers of the fiber sheet. The heat insulating member preferable for the exemplary embodiment of the present invention has a thermal conductivity less than or equal to 0.02 W/(m·K). The porous material preferably has a void structure such as xerogel or aerogel. In particular, silica aerogel and silica xerogel each have a nano-sized void structure that regulates movement of air molecules, and have excellent heat insulating performance. In addition, silica xerogel can stably maintain its structure against external pressure. Since silica particles have a high melting point, silica xerogel also has high heat resistance. Various fibers can be used as the fiber making up the fiber sheet, and may include flame retardant fiber having heat resistance. As the flame-retardant fiber, acrylic oxide fiber, flame retardant vinylon fiber, polyetherimide fiber, aramid fiber, glass fiber, and the like are known. In particular, since the fiber sheet contains glass fiber, it can be expected to improve rigidity and suppress creep deformation in addition to improvement of heat resistance. The heat insulating member using the fiber sheet containing the flame-retardant fiber is not damaged even if battery cell 1 is heated to a high temperature due to thermal runaway, and can stably cut off conduction of thermal energy to effectively inhibit induction of the thermal runaway.

Note that the fiber contained in the heat insulating member is preferably synthetic fiber having a small fiber diameter. The heat insulating properties of the heat insulating member arise from characteristics of powder described later, and by using the synthetic fiber having a small fiber diameter as a base material, a large amount of powder can be contained in the heat insulating material. The fiber sheet used in the present exemplary embodiment is preferably 1 μm to 30 μm from the viewpoint of achieving both thermal conductivity and productivity.

Further, the heat insulating member may be molded by adding a thermoplastic resin. By adjusting an additive when the heat insulating member is formed in this way, it is possible to appropriately design physical properties such as elasticity while maintaining heat insulating properties, heat resistance, and the like in accordance with required performance. Note that various characteristics can be imparted by coating a surface of the heat insulating member. For example, by covering with a coating layer made of alumina having a low emissivity, influence by radiant heat transfer of the heat insulating member can be suppressed.

(Separator 2A)

Figure 4:
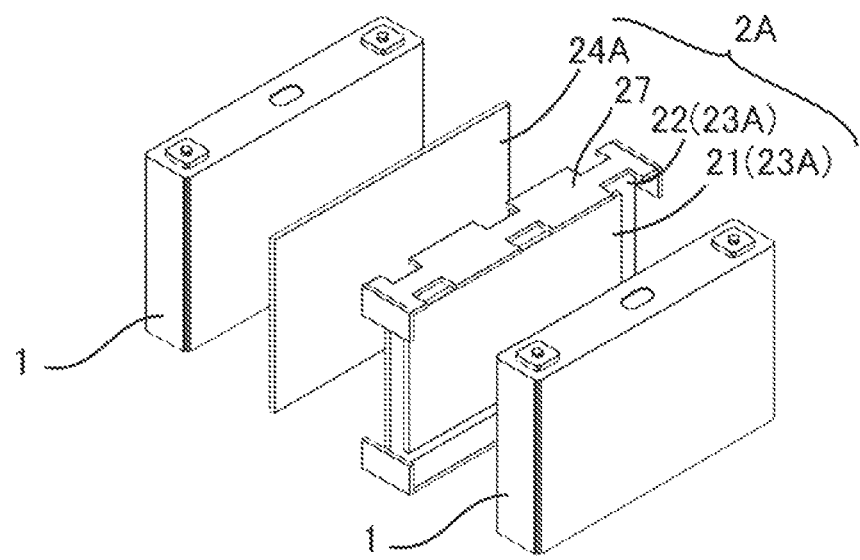
FIG. 4 is a perspective view showing one example of a separator of FIG. 1.

FIG. 4 is a perspective view for describing one example of separator 2 of FIG. 1. Separator 2A shown in FIG. 4 includes sandwiched and fixed plate portion 23A molded of a highly moldable resin, and heat insulating member 24A disposed on a surface of sandwiched and fixed plate portion 23A. As heat insulating member 24A, the above-described heat insulating member is preferably used. Sandwiched and fixed plate portion 23A has contact portion 21 and thin portion 22. Separator 2A can prevent welded portion 18 from being pressed by thin portion 22 by molding sandwiched and fixed plate portion 23A of a highly moldable resin. Further, as shown in FIG. 4, if necessary, peripheral wall 27 may be provided that protrudes from a peripheral edge of sandwiched and fixed plate portion 23A toward adjacent battery cells 1. Peripheral wall 27 extends along a side surface of battery cell 1, so that the displacement of battery cell 1 can be suppressed, and battery cell 1 can be held. By adopting separator 2 having peripheral wall 27, it is possible to improve a function such as assemblability of the power supply device.

A shape of heat insulating member 24A of separator 2A having the above-described configuration is not particularly limited, and a thickness, the shape, a disposition position, and the like can be freely selected in accordance with required heat insulating performance. That is, by dividing separator 2A into a portion formed of a resin having high moldability and a portion for ensuring the heat insulating performance, even a heat insulating member having low moldability can be adopted as the heat insulating member. While the above-described heat insulating member has low moldability and is difficult to be molded into a shape other than a sheet shape, such a heat insulating member can be used as long as the configuration of separator 2A is adopted.

(Separator 2B)

Figure 5:
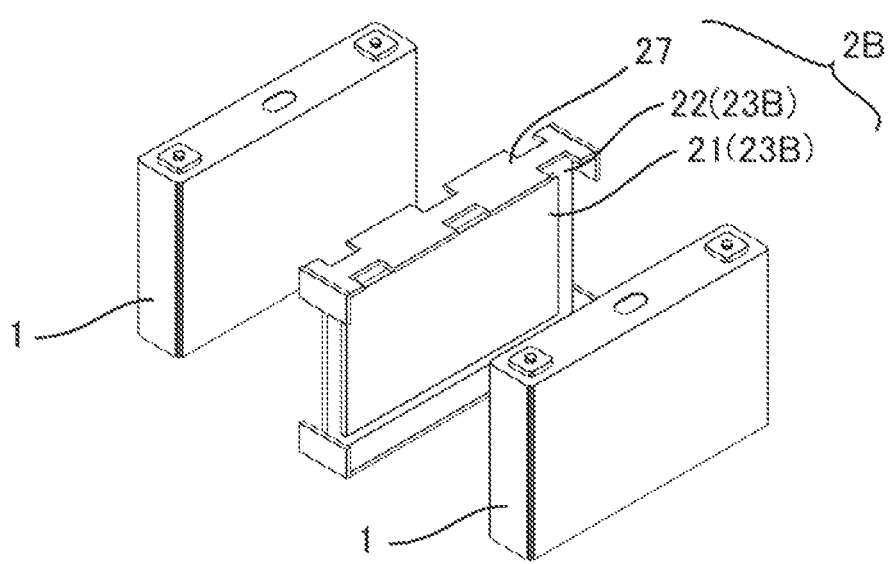
FIG. 5 is a perspective view showing one example of the separator of FIG. 1.
Figure 6:
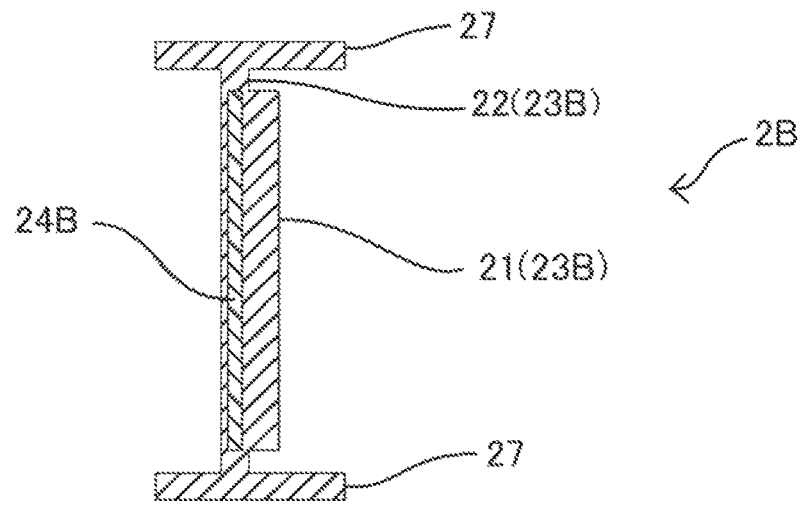
FIG. 6 is a cross sectional view of a separator of FIG. 5.

FIGS. 5 and 6 are perspective views for describing one example of separator 2 of FIG. 1. Separator 2B shown in FIGS. 5 and 6 includes sandwiched and fixed plate portion 23B molded of a highly moldable resin and heat insulating member 24B disposed inside sandwiched and fixed plate portion 23B. As heat insulating member 24B, the above-described heat insulating member is preferably used. Sandwiched and fixed plate portion 23B has contact portion 21 and thin portion 22. Separator 2B can prevent welded portion 18 from being pressed by thin portion 22 by molding sandwiched and fixed plate portion 23B of a highly moldable resin. Further, as shown in FIGS. 5 and 6, if necessary, peripheral wall 27 may be provided that protrudes from a peripheral edge of sandwiched and fixed plate portion 23B toward adjacent battery cells 1.

Specifically, in separator 2B, heat insulating member 24B is insert-molded of the highly moldable resin such that heat insulating member 24B is located inside sandwiched and fixed plate portion 23B. Note that while it depends on the characteristics of the used heat insulating member, it is preferable that a surface of heat insulating member 24B is covered with a film for preventing penetration of the resin. Some heat insulating members having a plurality of pores achieve heat insulation by an air layer in the pores. In the case of such a heat insulating member, if the pores are filled with the resin, there is a risk that the heat insulating performance is significantly deteriorated. By insert molding heat insulating member 24B covered with the film, the film can suppress the penetration of the resin and suppress the deterioration of the heat insulating performance. Note that in the case of a heat insulating member that does not have a risk that the pores are filled with the resin, the heat insulating member does not necessarily have to be covered with a film.

Since heat insulating member 24B is configured to be covered with a highly moldable resin in separator 2B having the above configuration, a shape of heat insulating member 24B is not particularly limited, and a thickness and the shape are adjusted in accordance with required heat insulating performance.

(Separator 2C)

Figure 7:
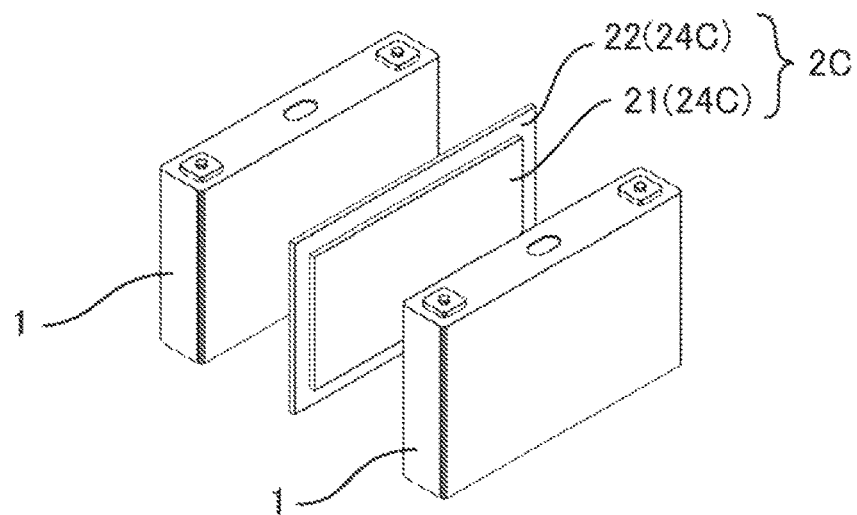
FIG. 7 is a perspective view showing one example of the separator of FIG. 1.

FIG. 7 is a perspective view for describing one example of separator 2 of FIG. 1. Separator 2C shown in FIG. 7 includes heat insulating member 24C molded by adding a thermoplastic resin. As heat insulating member 24C, the above-described heat insulating member is preferably used. Heat insulating member 24C containing the thermoplastic resin can be molded into a plate shape having contact portion 21 and thin portion 22 by press molding heat insulating member 24C in a heated state. Specifically, by partially press-molding sheet-shaped heat insulating member 24C, separator 2C having thin portion 22 and contact portion 21 can be molded. In separator 2C molded in this way, the press-molded portion corresponds to thin portion 22. With the above configuration, separator 2C can prevent welded portion 18 from being pressed by thin portion 22.

Note that separator 2C can also be molded by pressing the sheet-shaped heat insulating member 24C so as to have a partially different thickness. In the case of this configuration, a compressibility of contact portion 21 and thin portion 22 are different. Heat insulating member 24C containing a thermoplastic resin is heated and compressed to improve its rigidity.

In separator 2C having the above configuration, a separator having contact portion 21 and thin portion 22 can be molded by using a sheet-shaped heat insulating member. The separator having this configuration is preferable for a separator having a relatively simple shape.

(Separator 2D)

Figure 8:
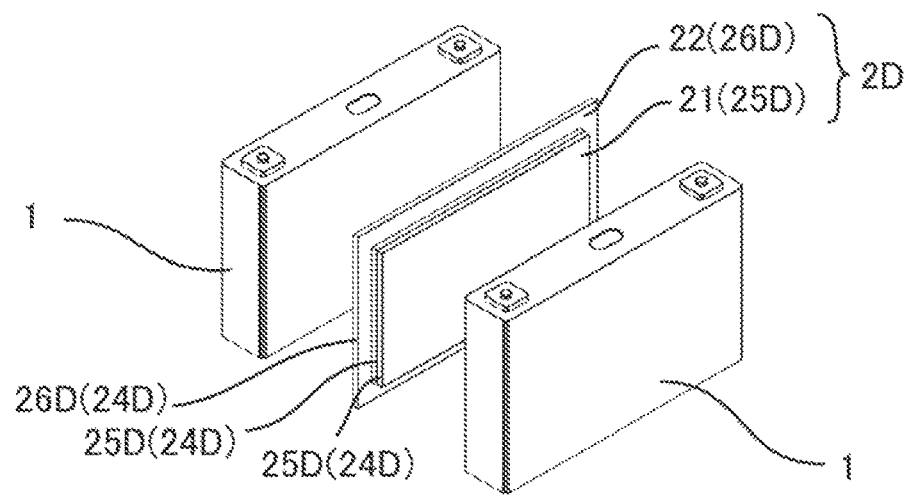
FIG. 8 is a perspective view showing one example of the separator of FIG. 1.

FIG. 8 is a perspective view for showing one example of separator 2 of FIG. 1. Separator 2D shown in FIG. 8 is made up of a plurality of sheet-shaped heat insulating members 24D. Specifically, separator 2D is formed by laminating the plurality of heat insulating members 24D having different dimensions. The plurality of heat insulating members 24D configuring separator 2D include first sheet 25D having an area smaller than a wide surface of an outer can of the adjacent battery cell, and second sheet 26D having an area larger than first sheet 25D. An adhesive layer is interposed between first sheet 25D and second sheet 26D, and first sheet 25D and second sheet 26D are joined to each other. A configuration of the adhesive layer may be any configuration, and various materials such as an adhesive and a double-sided tape can be used. First sheet 25D is located in a center of the second sheet. With the above configuration, separator 2D having thin portion 22 and contact portion 21 can be molded, and the pressure of welded portion 18 by thin portion 22 can be prevented.

Note that by laminating a plurality of first sheets 25D, a size of a gap between thin portion 22 and battery cell 1 can be adjusted. Therefore, separator 2D having the above configuration is preferable for molding the separator using a heat insulating member that is difficult to mold thickly.

Second Exemplary Embodiment

Figure 9:
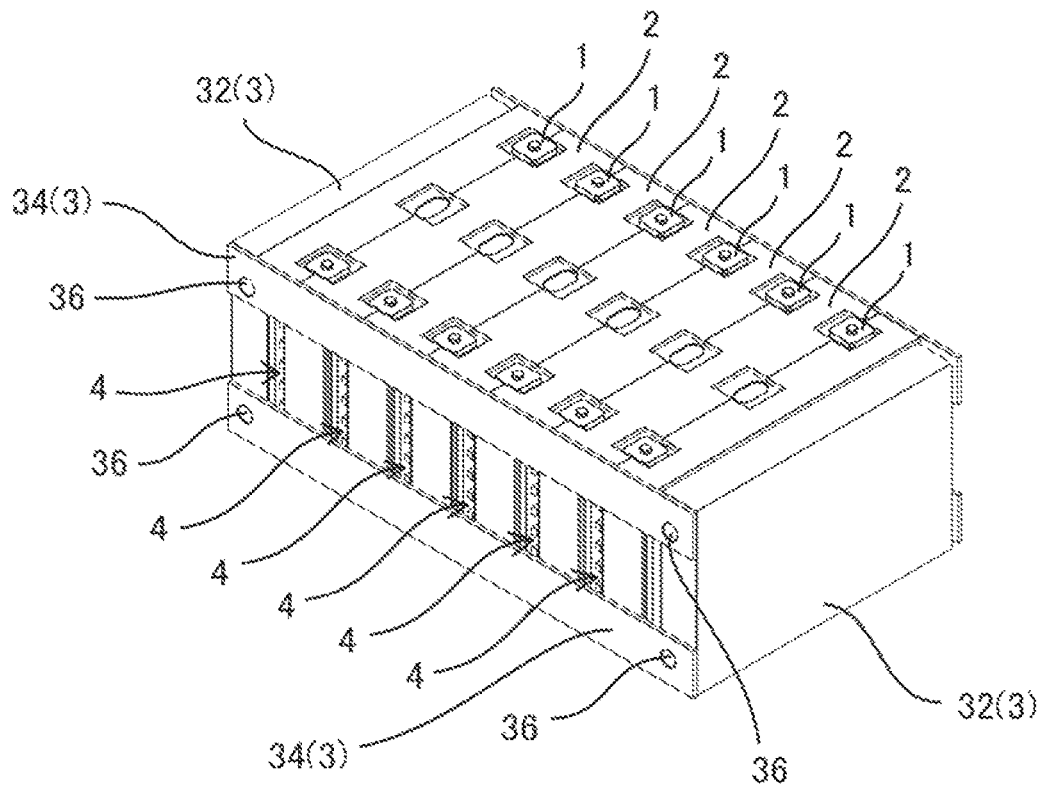
FIG. 9 is a perspective view of a power supply device according to a second exemplary embodiment of the present invention.

FIG. 9 is a perspective view showing power supply device 200 according to a second exemplary embodiment of the present invention. Note that in the following description, components similar to those in the first exemplary embodiment are denoted by the same reference marks, and description thereof will be omitted. As shown in FIG. 9, power supply device 200 of the second exemplary embodiment has a configuration in which cooling gap 4 is formed between separator 2 and battery cell 1. Since high temperature promotes deterioration of battery cell 1, battery cell 1 has a configuration in which the deterioration of the battery can be suppressed by cooling battery cell 1. Note that as illustrated in FIG. 9, bind bars 34 are preferably shaped such that cooling air can be introduced into cooling gap 4 between separator 2 and battery cell 1. Specifically, power supply device 200 illustrated in FIG. 9 has a configuration in which a pair of bind bars 34 are provided on one side surface, and an inlet of each of cooling gaps 4 faces between the pair of bind bars 34.

(Separator 2E)

Figure 10:
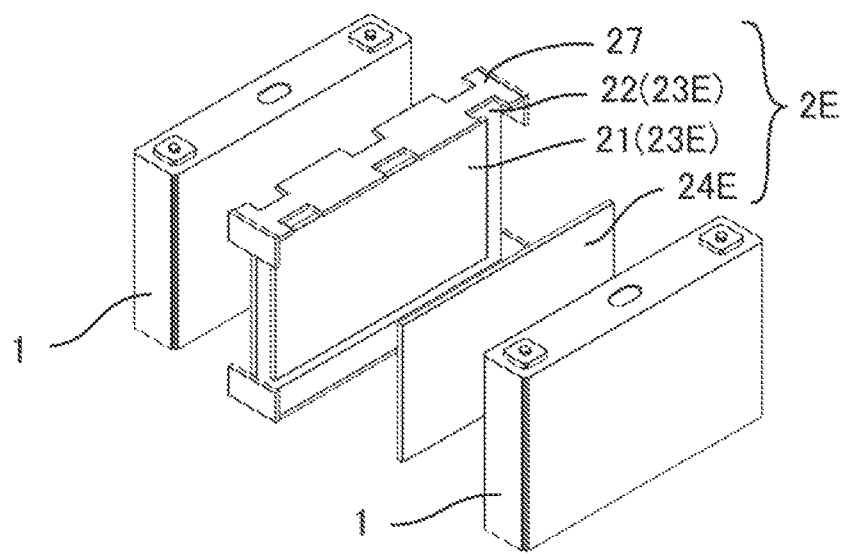
FIG. 10 is a perspective view showing one example of a separator of FIG. 9.
Figure 11:
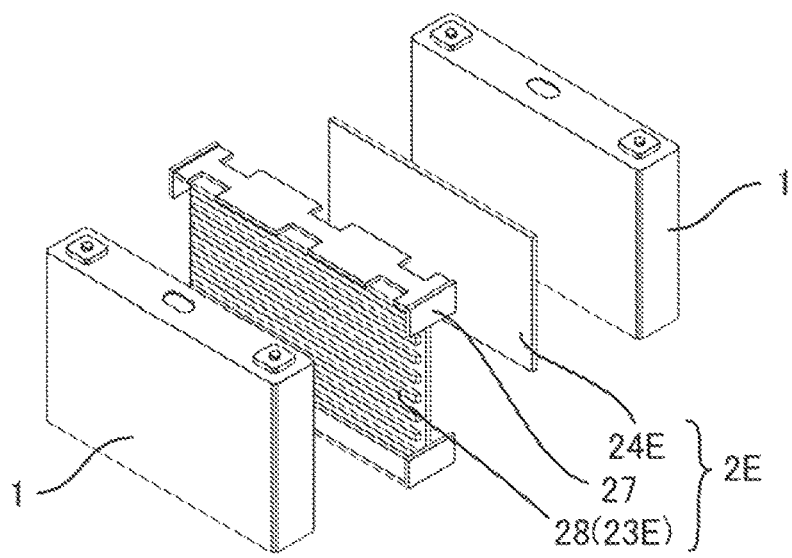
FIG. 11 is a perspective view when a viewpoint of FIG. 10 is changed.

FIGS. 10 and 11 are perspective views for showing one example of separator 2 of FIG. 9. Separator 2E shown in FIGS. 10 and 11 includes sandwiched and fixed plate portion 23E molded of a highly moldable resin, and heat insulating member 24E disposed on a surface of sandwiched and fixed plate portion 23E. As heat insulating member 24E, the above-described heat insulating member is preferably used. Sandwiched and fixed plate portion 23E includes contact portion 21, thin portion 22, and a plurality of ribs 28, and contact portion 21 is formed on one surface of sandwiched and fixed plate portion 23E, and the plurality of ribs 28 are formed on another surface of sandwiched and fixed plate portion 23E. The plurality of ribs 28 comes into contact with the outer can of the adjacent battery cell to form cooling gap 4 between adjacent ribs 28. Battery cell 1 can be cooled by cooling gas such as air forcibly blown into cooling gap 4 flowing through cooling gap 4 of separator 2E.

In separator 2E, heat insulating member 24E is disposed on the surface where contact portion 21 of sandwiched and fixed plate portion 23E is formed. Heat insulating member 24E is preferably a highly flexible heat insulating member. The highly flexible heat insulating member is pressed by contact portion 21 of sandwiched and fixed plate portion 23E, and indirectly presses the wide surface of outer can 12 of battery cell 1. According to this configuration, even when heat insulating member 24E is larger than contact portion 21 of sandwiched and fixed plate portion 23E, deformation of heat insulating member 24E can suppress a load on welded portion 18. Note that when heat insulating member 24E having relatively high rigidity is adopted, it is preferable that an area of heat insulating member 24E is smaller than that of contact portion 21, or that contact portion 21 is formed of heat insulating member 24E.

(Separator 2F)

Figure 12:
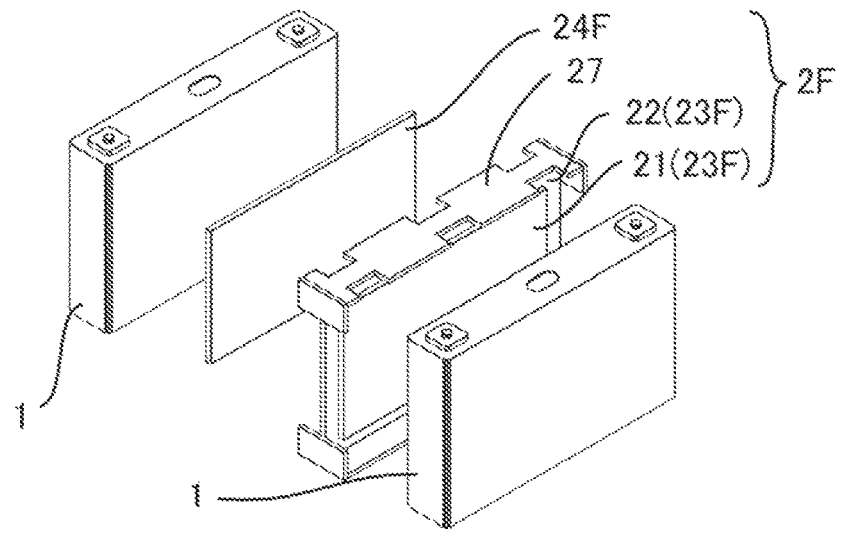
FIG. 12 is a perspective view showing one example of the separator of FIG. 9.
Figure 13:
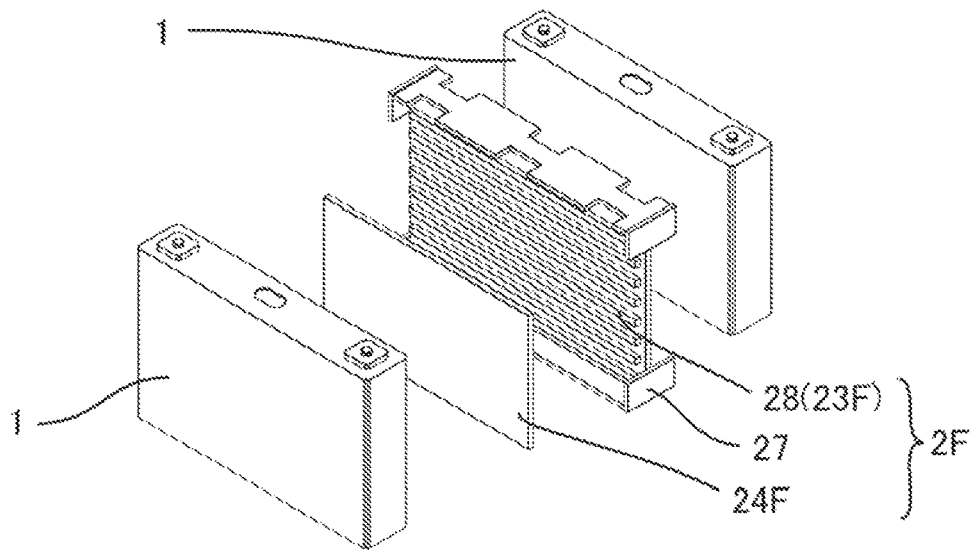
FIG. 13 is a perspective view when a viewpoint of FIG. 12 is changed.

FIGS. 12 and 13 are perspective views for showing one example of separator 2 of FIG. 9. Separator 2F shown in FIGS. 12 and 13 includes sandwiched and fixed plate portion 23F molded of a highly moldable resin, and heat insulating member 24F disposed on a surface of sandwiched and fixed plate portion 23F. As heat insulating member 24F, the above-described heat insulating member is preferably used. Sandwiched and fixed plate portion 23F includes contact portion 21, thin portion 22, and a plurality of ribs 28, and contact portion 21 is formed on one surface of sandwiched and fixed plate portion 23F, and the plurality of ribs 28 are formed on another surface of sandwiched and fixed plate portion 23F.

In separator 2F, heat insulating member 24F is disposed on the surface where the plurality of ribs 28 of sandwiched and fixed plate portion 23F are formed. A power supply device using the separator having this configuration can be expected to have an effect of suppressing local deformation of the outer can due to the ribs 28. In the case of the separator having the cooling gap, ribs for partitioning the cooling gap are required. Therefore, a contact area between the surface of sandwiched and fixed plate portion 23F on which the ribs 28 are formed, and the outer can is smaller than a contact area between contact portion 21 of sandwiched and fixed plate portion 23F and the outer can. Therefore, there is a risk that a stress is concentrated on the outer can with which ribs 28 are in contact as compared with the outer can with which the contact portion is in contact. In the exemplary embodiment including the separators shown in FIGS. 11 and 12, ribs 28 come into indirect contact with outer can 12, so that the stress can be dispersed.

According to the above configuration, the pair of end plates 32 are fixed to a predetermined size via the restraining member, and battery cells 1 stacked between them are fixed in a compressed state, and the expansion of the battery cells can be suppressed. Therefore, the stress is concentrated on the contact parts between the respective members disposed between the pair of end plates 32. In the configurations of the above described exemplary embodiments, since in separator 2 disposed between adjacent battery cells 1, thin portion 22 is provided at the position opposed to welded portion 18 where the opening portion of the outer can and the sealing body of the adjacent battery cell are welded, it is possible to suppress the load on welded portion 18. That is, each of the power supply devices according to the exemplary embodiments of the present invention can suppress the heat transfer between the adjacent battery cells, and can prevent the stress from being concentrated on the welded portions of the battery cells.

The present invention has been described above on the basis of the exemplary embodiments. It will be appreciated by those skilled in the art that these exemplary embodiments are exemplary and that various modifications can be made for each of their components and combinations of processing processes, and that such modifications are also within the scope of the present invention.

REFERENCE MARKS IN THE DRAWINGS

100,200 power supply device
1 battery cell
12 outer can
14 sealing body
16 electrode terminal
18 welded portion
2, 2A, 2B, 2C, 2D, 2E, 2F separator
21 contact portion
22 thin portion
23A, 23B, 23E, 23F sandwiched and fixed plate portion
24A, 24B, 24C, 24D, 24E, 24F heat insulating member
25D first sheet
26D second sheet
27 peripheral wall
28 rib
3 restraining member
32 end plate
34 bind bar
36 set screw
4 cooling gap

The invention claimed is:

1. A power supply device comprising:
a plurality of battery cells each having a square outer shape;
a plurality of separators each insulating adjacent battery cells among the plurality of battery cells,
each of the plurality of separators having heat insulating properties, being disposed between battery cells adjacent to the each of the plurality of separators, and including a contact portion and a thin portion,
the contact portion coming into contact with a battery cell adjacent to the each of the plurality of separators among the plurality of battery cells, and the thin portion being formed thinner than the contact portion; and
a restraining member that assembles the plurality of battery cells and the plurality of separators,
wherein the contact portion is directly sandwiched between adjacent battery cells in a stacking direction in which the plurality of battery cells are stacked,
the thin portion extends from the contact portion toward an outer perimeter of the adjacent battery cells in a direction perpendicular to the stacking direction,
wherein each of the plurality of separators includes a sandwiched and fixed plate portion provided with the contact portion and the thin portion, and a heat insulating member disposed between the sandwiched and fixed plate portion and a battery cell adjacent to the sandwiched and fixed plate portion, and
wherein the heat insulating member contains a fiber sheet containing main fiber, and powder supported on the fiber sheet.

2. The power supply device according to claim 1, wherein each of the plurality of battery cells includes:
an outer can having a flat rectangular parallelepiped shape and having an opening; and
a sealing body welded to an opening portion of the outer can, and
the thin portion extends along a welded portion between a sealing body and an opening portion of an outer can of a battery cell adjacent to the thin portion.

3. The power supply device according to claim 1, wherein each of the plurality of separators includes a sandwiched and fixed plate portion provided with the contact portion and the thin portion, and a heat insulating member embedded inside the sandwiched and fixed plate portion.

4. The power supply device according to claim 1, wherein each of the plurality of separators includes a sandwiched and fixed plate portion provided with the contact portion and the thin portion, and
the sandwiched and fixed plate is a heat insulating member containing a thermoplastic resin, and the thin portion has a higher compressibility than the contact portion.

5. The power supply device according to claim 1, wherein each of the plurality of separators is a heat insulating member made of a plurality of laminated sheets each having heat insulating properties, and the plurality of laminated sheets include a first sheet having an area corresponding to the contact portion, and a second sheet having an area larger than the area of the first sheet, and the first sheet and the second sheet adhere to each other.

6. The power supply device according to claim 1, wherein the powder contains silica aerogel or silica xerogel.

7. The power supply device according to claim 1, wherein the fiber sheet contains at least one of flame-retardant vinylon fiber, polyetherimide fiber, aramid fiber, and glass fiber.

* * * * *